United States Patent
Matsumoto

(10) Patent No.: US 6,697,481 B2
(45) Date of Patent: Feb. 24, 2004

(54) CALL CENTER SYSTEM, METHOD FOR RECEIVING CALL, AND A COMPUTER PROGRAM THEREOF

(75) Inventor: Teruoki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 09/888,392

(22) Filed: Jun. 26, 2001

(65) Prior Publication Data

US 2002/0001379 A1 Jan. 3, 2002

(30) Foreign Application Priority Data

Jun. 28, 2000 (JP) .................................. 2000-195134

(51) Int. Cl.[7] .......................... H04M 3/00; H04M 5/00; H04M 1/64; H04M 11/00
(52) U.S. Cl. ................. 379/265.09; 379/69; 379/88.01; 379/93.12; 379/266.01
(58) Field of Search .................. 379/265.09, 88.01, 379/266.01, 93.12, 69

(56) References Cited

FOREIGN PATENT DOCUMENTS

| JP | 2-67059 | 3/1990 |
|---|---|---|
| JP | 6-276299 | 9/1994 |
| JP | 7-131534 | 5/1995 |
| JP | 8-265432 | 10/1996 |
| JP | 10-42047 | 2/1998 |
| JP | 11-46251 | 2/1999 |
| JP | 11-98252 | 4/1999 |
| JP | 11-215528 | 8/1999 |
| JP | 11-317817 | 11/1999 |

*Primary Examiner*—Ahmad F. Matar
*Assistant Examiner*—Thjuan P Knowlin
(74) *Attorney, Agent, or Firm*—Young & Thompson

(57) ABSTRACT

The customer inputs the customer's identification data to the customer's terminal (7). The customer's terminal sends the input identification data to the server (2). The server (2) acquires from the database (3) historical information of the customer corresponding to the identification data. The server (2) sends the acquired historical information to the customer terminal (7). The customer terminal (7) displays the historical information by a browser. By doing this, the customer is able to select a desired operator based on the displayed historical information. The customer terminal (7) sends the selected operator information to the server (2). The server (2) connects the operator terminal of the selected operator to the customer terminal (7). The PBX (4) connects the operator telephone of the selected operator to the customer telephone (8).

21 Claims, 7 Drawing Sheets

CALL CENTER SYSTEM, METHOD FOR RECEIVING CALL, AND A COMPUTER PROGRAM THEREOF

BACKGROUND OF THE INVENTION

1. Field of the Invention

The present invention relates to a call center system in which a customer accesses a call center via the Internet, to a method of receiving calls therein.

2. Related Art

In a call center system in the past, a customer accessed a call center via a network. The call center in this case was the order-acceptance contact for a mail-order sales, or consultation contact for various services. In general, the call center had a plurality of operators on duty at all times.

In a system of this type, when a customer requests access to the call center, a server performing overall control of the call center selects an appropriate operator from the plurality of operators, and causes that operator to handle the customer.

Otherwise when the customer requests access to the call center, the above-noted server selected the operator which previously handled the customer, causing that operator to handle the customer.

In a call center system of the past such as noted above, the server of the call center selects the operator that handles a customer, and the customer cannot select the operator. For this reason, there is a possibility that the customers' wishes are not reflected, the result being a possible future drop in the rate of access to the call center.

Accordingly, it is an object of the present invention to provide a call center system in which a customer can select an operator, a method for receiving calls therein.

SUMMARY OF THE INVENTION

To achieve the above-noted object, the present invention adopts the following basic technical constitution.

Specifically, a first aspect of the present invention is a call center system in which a customer's computer terminal is connected via the Internet to an operator's computer terminal provided in a call center and a customer's telephone is connected via a public telephone network to an operator's telephone in a call center, wherein the call center system comprising: a storage means for storing historical information with regard to handling of a plurality of customers in the past, a customer data receiving means for receiving identification data of a customer from the customer's computer terminal, an information acquiring means for acquiring historical information of the customer corresponding to the received identification data from the stored historical information, a historical information providing means for providing the acquired historical information to the customer's computer terminal, a requesting means for requesting the customer's computer terminal to select an operator to be contacted, based on the historical information provided to the customer's computer terminal, a selection data receiving means for receiving information of an operator which the customer selected from the historical information, a first connection means for connecting a selected operator's computer terminal to the customer's computer terminal, and a second connection means for connecting a selected operator's telephone to the customer's telephone.

A second aspect of the present invention is that the second connection means is a gatekeeper provided in the call center.

A third aspect of the present invention is that the second connection means is a private branch exchange provided in the call center.

A fourth aspect of the present invention is a call center system in which a customer's computer terminal is connected via the Internet to an operator's computer terminal provided in a call center, wherein the call center system comprising: a storage means for storing historical information with regard to handling of a plurality of customers in the past, a customer data receiving means for receiving identification data of a customer from the customer's computer terminal, an information acquiring means for acquiring historical information of the customer corresponding to the received identification data from the stored historical information, a historical information providing means for providing the acquired historical information to the customer's computer terminal, a requesting means for requesting the customer's computer terminal to select an operator to be contacted, based on the historical information provided to the customer's computer terminal, a selection data receiving means for receiving information of an operator which the customer selected from the historical information, a connection means for connecting a selected operator's computer terminal to the customer's computer terminal, and a gateway for transferring a selected operator's voice to the customer's computer terminal.

A fifth aspect of the present invention is that the selected operator's voice is input to the gateway via a private branch exchange provided in the call center.

A sixth aspect of the present invention is a call center system in which a customer's computer terminal is connected via the Internet to an operator's computer terminal provided in a call center, wherein the call center system comprising: a storage means for storing historical information with regard to handling of a plurality of customers in the past, a customer data receiving means for receiving identification data of a customer from the customer's computer terminal, an information acquiring means for acquiring historical information of the customer corresponding to the received identification data from the stored historical information, a historical information providing means for providing the acquired historical information to the customer's computer terminal, a requesting means for requesting the customer's computer terminal to select an operator to be contacted, based on the historical information provided to the customer's computer terminal, a selection data receiving means for receiving information of an operator which the customer selected from the historical information, a connection means for connecting a selected operator's computer terminal to the customer's computer terminal, and a gatekeeper for transferring a selected operator's voice to the customer's computer terminal.

A seventh aspect of the present invention is that the call center system further comprising; a verification means for verifying whether or not the selected operator is available, and a notification means for notifying the customer's computer terminal that the selected operator is not available, and requesting the customer's computer terminal to select another operator, in a case in which the selected operator is not available.

A eighth aspect of the present invention is that the call center system further comprising; a verification means for verifying whether or not the selected operator is available, and an alternate connection means for connecting a terminal of another operator to the customer's computer terminal, in a case in which the selected operator is not available.

A ninth aspect of the present invention is that the call center system further comprising; a monitoring means for continuously monitoring whether or not each operator in the call center is available, and a monitoring results providing means for providing results of the monitoring to the customer's computer terminal.

DETAILED DESCRIPTION OF THE PREFERRED EMBODIMENTS

Embodiments of the present invention are described in detail below, with references made to relevant accompanying drawings.

(First Embodiment)

Figure 1:
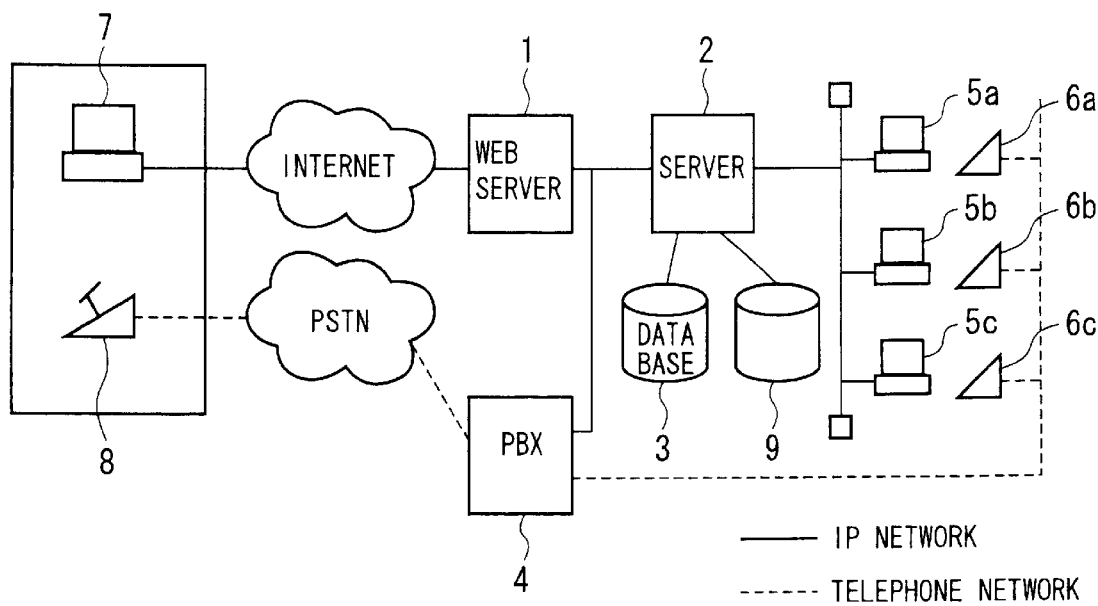
FIG. 1 is a block diagram showing the first embodiment of a call center system according to the present invention.
Figure 2:
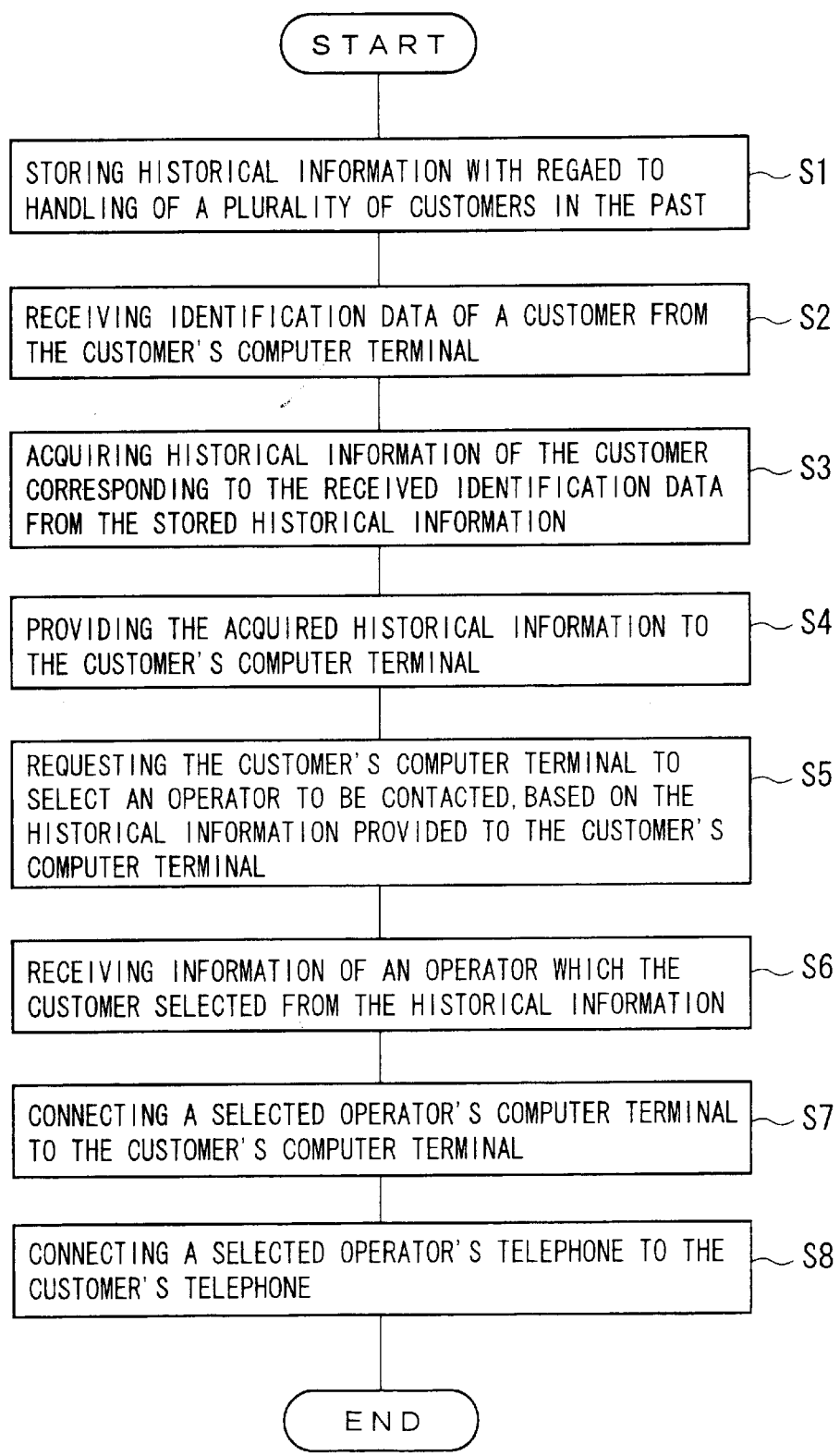
FIG. 2 is a flowchart illustrating the call center system of FIG. 1.

Specifically, FIG. 1 is a block diagram showing an example of the configuration of a call center system according to an embodiment of the present invention, and FIG. 2 is a flowchart illustrating the call center system of FIG. 1. This system is a Web-linked system, in which when a customer requests access to a web page that is publicized by the call center, this request is transmitted via a Web server 1 to a server 2.

The above-noted Web server 1 and server 2 are both provided at the call center. The Web server 1 provides the web page and receives an access request via the web page. The server 2 performs overall control of the web page. More specifically, the Web server 1 and the server 2 are implemented as a computer apparatus made up of a CPU and associated peripheral circuitry. The computer apparatus is controlled by a control program stored in an prescribed storage medium (for example, magnetic disk or semiconductor memory), so as to perform operation as described further below. The above-noted control program can be distributed via a communication network.

A database 3 is connected to the server 2. The database 3 stores information with regard to customers and operators.

The server 2 connects a customer terminal 7 to an arbitrary operator terminal of operator terminals 5a to 5c. An in-house telephone exchange (hereinafter referred to as the PBX), based on control from the server 2, connects a customer telephone 8 to an arbitrary operator telephone of operator telephones 6a to 6c.

The above-noted customer terminal 7 and customer telephone 8 are held by the customer. The customer terminal 7 is a computer terminal connected to the Internet. The customer telephone 8 is a telephone connected to a public telephone network (hereinafter referred to as a PSTN). The customer terminal 7 and the customer telephone 8 can be used simultaneously.

The operation of the above-noted call center system is described below, using the example of an order-entry system for a mail-order business.

First, a customer uses the customer terminal 7 to view a web page publicly disclosed by the sales entity. When the customer requests access to the call center, the customer terminal 7 is used to input the customer's identification data. The identification data input at this point is the account and password specified by the sales entity. The customer terminal 7 sends the input identification data to the server 2 via the Web server 1.

Upon receiving the identification data, the server 2 acquires from the database 3 historical information of the customer corresponding to the identification data. The server 2 sends the acquired historical information to the customer terminal 7 via the Web server 1. The historical information includes a record of past customer handling, the content thereof, and the information of the operator handling the customer in the past.

The customer terminal 7, upon receiving the historical information, displays the historical information by a browser. By doing this, the customer is able to select a desired operator from past operators who have handled the customer, based on the displayed historical information. When the customer selects an operator, the customer terminal 7 sends the selected operator information to the server 2 via the Web server 1.

The server 2, upon receiving the selected operator information, connects the operator terminal of the selected operator to the customer terminal 7. The server 2 also sends the selected operator information to the PBX 4. The PBX 4, upon receiving the selected operator information, connects the operator telephone of the selected operator to the customer telephone 8.

When the above-described connections have been completed, the server 2 stores information regarding this series of processing operations to the database 8 as historical information. By doing this, if there is a need to make access once again, by performing the same type of processing, it is possible to reflect the wishes of the customer in selecting an operator.

The above completes the operational description of a call center system having the above-noted configuration.

While an embodiment of the present invention was described above with reference to the accompanying drawings, it will be understood that the present invention is not restricted to this embodiment, and can be the subject of design modifications, within the scope of the purport of the present invention. One such variation is described below.

(Second Embodiment)

Figure 3:
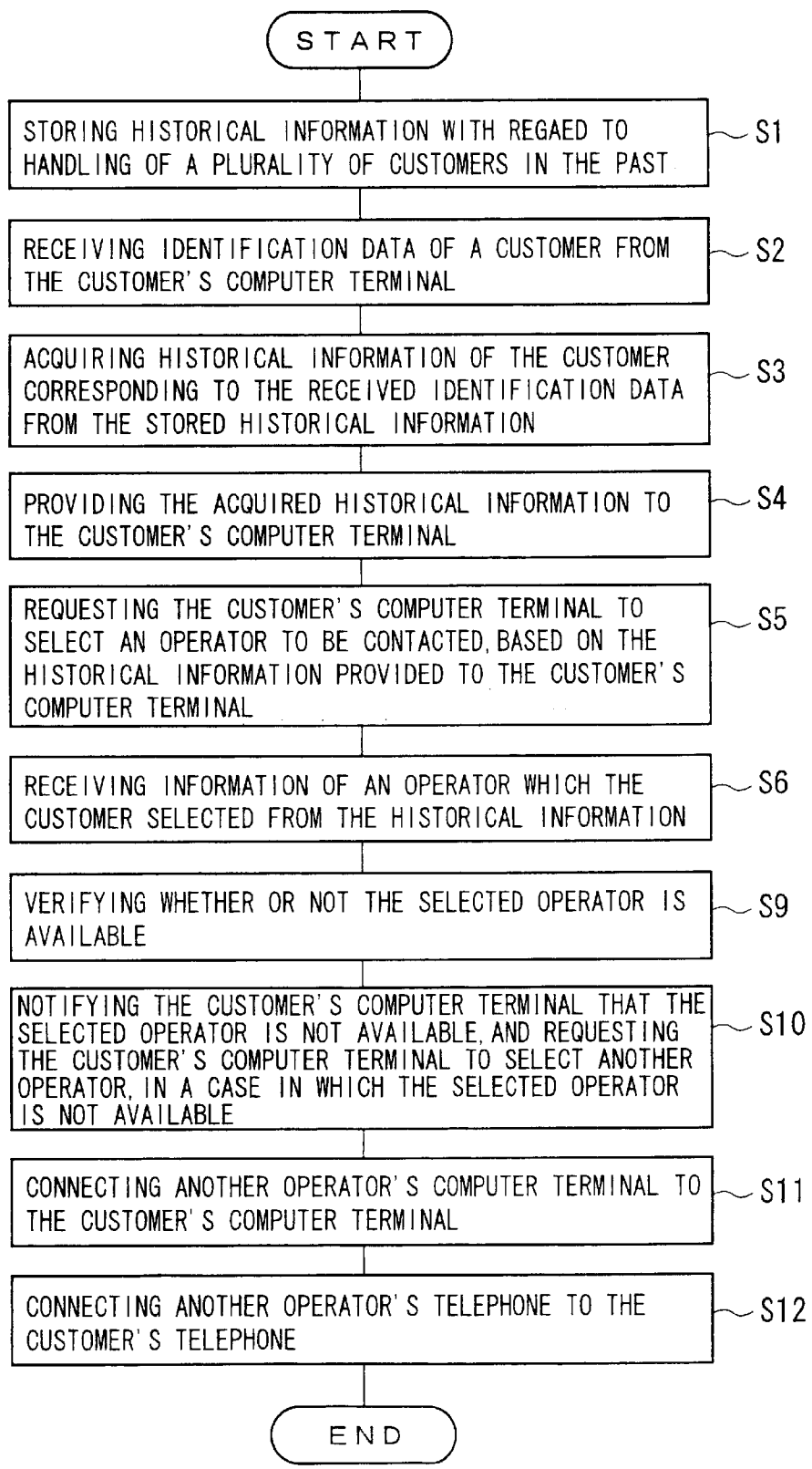
FIG. 3 is a flowchart showing the second embodiment of the call center system according to the present invention.

FIG. 3 is a flowchart showing the second embodiment of the call center system according to the present invention.

In the above-described embodiment the server 2, upon receiving information of an operator selected by the customer, verifies whether or not the operator is available.

In a case in which the selected operator is not available, the server 2 makes notification to this effect to the customer terminal 7, via the Web server 1. By browsing a display that the selected operator is not available, the customer terminal 7 requests the customer to make another operator selection.

Otherwise when the selected operator is not available, the server 2 connects an operator terminal of another operator to the customer terminal 7, in accordance with a prescribed scenario stored in a scenario control database 9.

(Third Embodiment)

Figure 4:
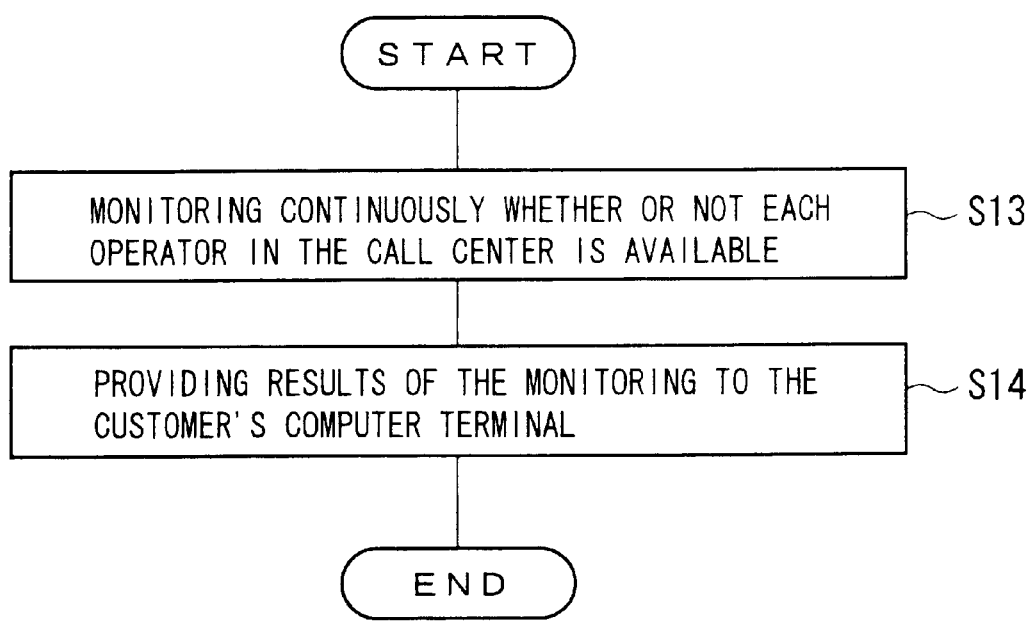
FIG. 4 is a flowchart showing the third embodiment of the call center system according to the present invention.

FIG. 4 is a flowchart showing the second embodiment of the call center system according to the present invention.

In the above-described embodiment, it is possible to perform continuous monitoring of the status of each operator (that is, whether or not operators are available). The server 2 sends the status of each operator, along with the above-noted historical information, to the customer terminal 7.

The customer terminal 7 provides the status of each operator and the above-noted historical information on a browser display. By doing this, the customer is able to catch the status of a desired operator, and as a result to eliminate wasteful access operations.

Furthermore by making a link to a call-back system, it is possible to make a operator-specified call-back request.

(Fourth Embodiment)

In this case, an information of an operator specified by a customer is stored as statistics data by using an MIS (management information system), which can either be built into the server 2 or be a stand-alone type. The above-noted management statistics information can be output as a report at appropriate by the call center administrator.

(Fifth Embodiment)

It is further possible to implement an Internet-only system.

Figure 5:
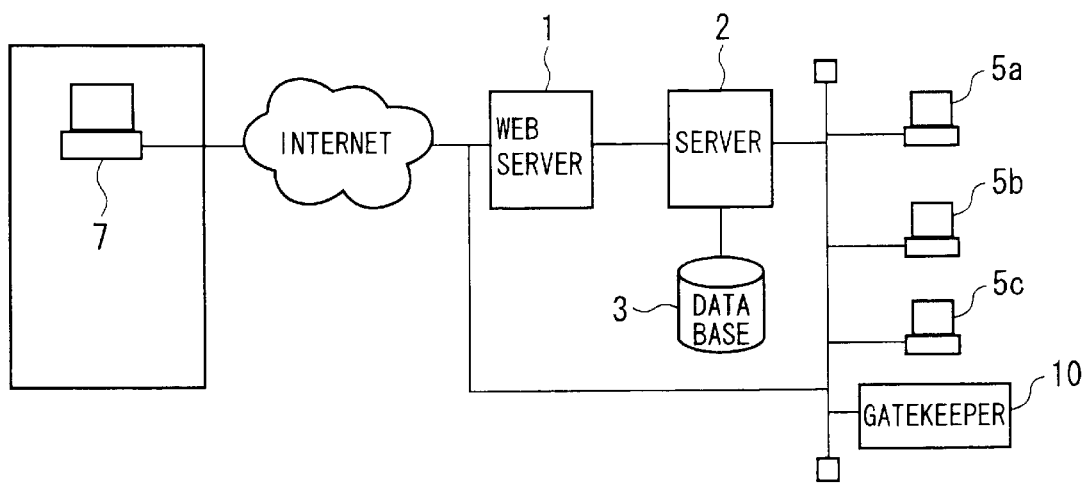
FIG. 5 is a block diagram showing the fifth embodiment of the call center system according to the present invention.
Figure 6:
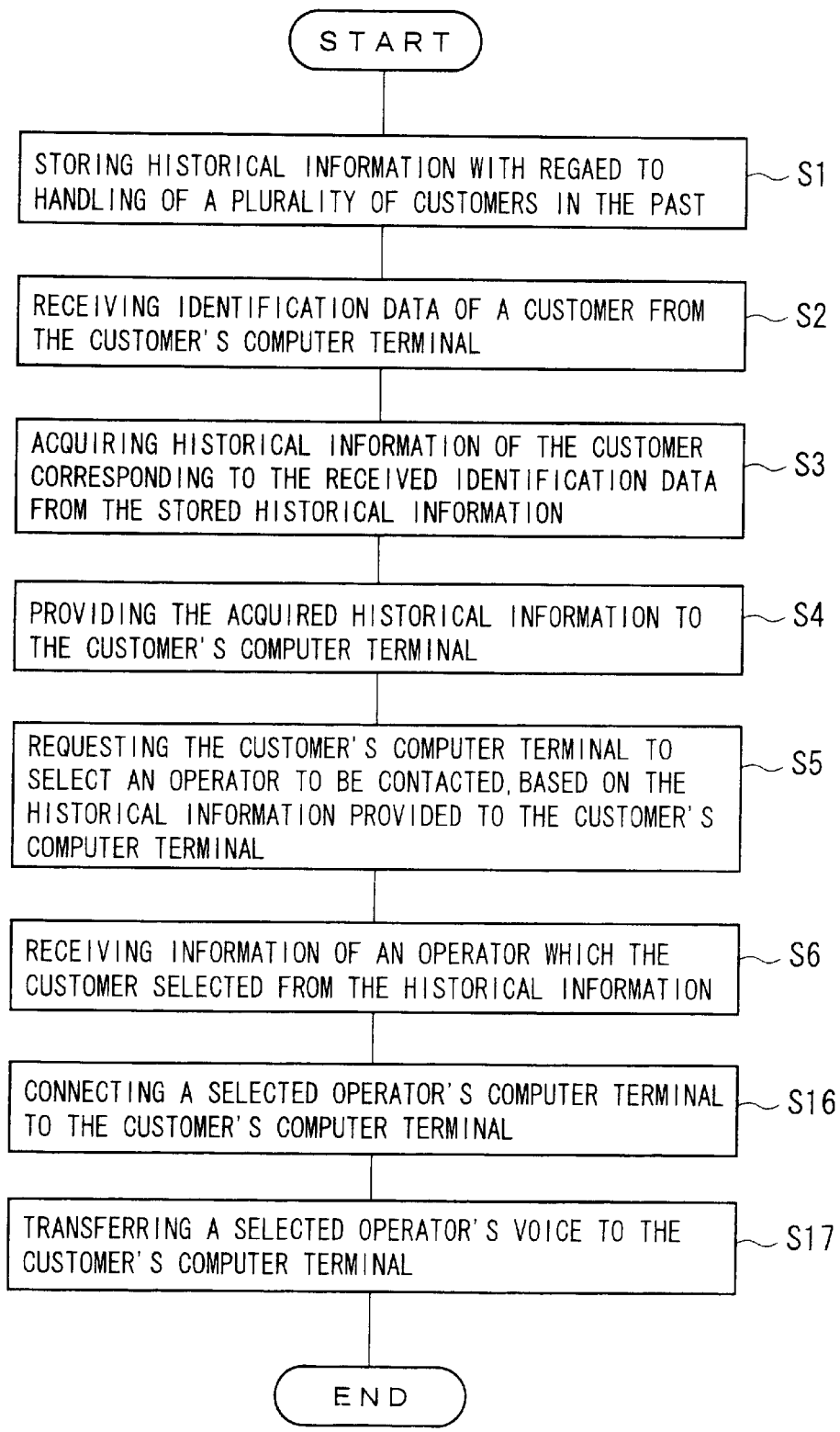
FIG. 6 is a flowchart illustrating the call center system of FIG. 5.

FIG. 5 is a block diagram showing a fifth embodiment of the present invention, in this case, a PBX 4 is not used, and a VoIP (Voice over IP) such as H. 323 is used. FIG. 6 is a flowchart illustrating the call center system of FIG. 5.

In this case, information of an operator selected by a customer is processed by the server 2, and is connected to the Internet by a gatekeeper 10. In the system shown in FIG. 5, because a PSTN is not necessary, there is a reduction in the cost of implementing the system.

(Sixth Embodiment)

Figure 7:
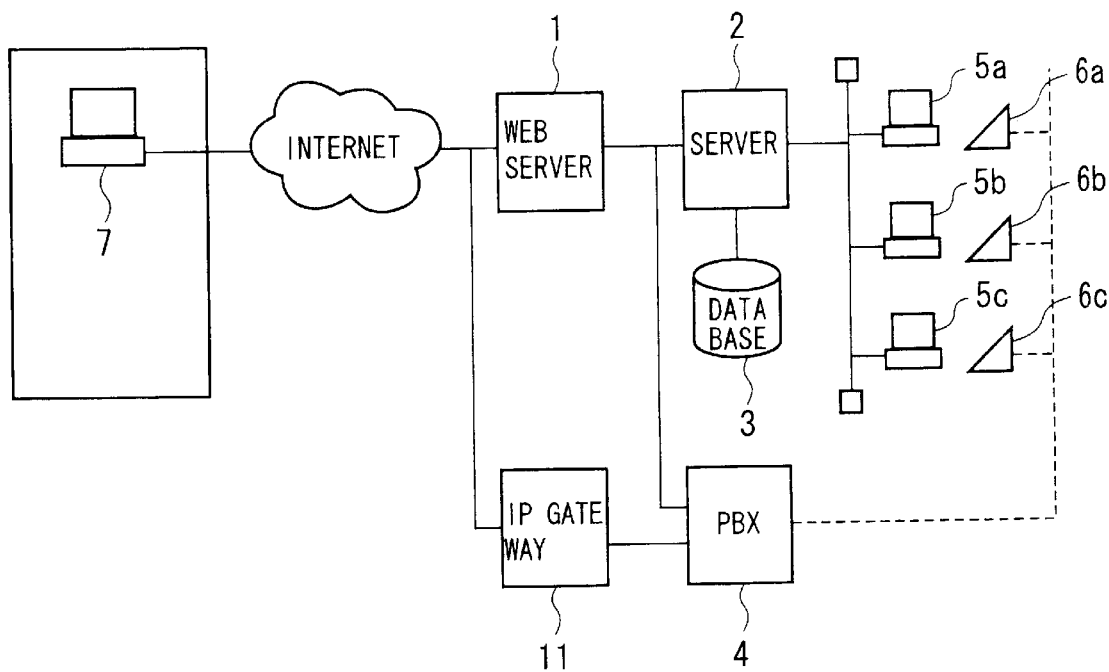
FIG. 7 is a block diagram showing the sixth embodiment of the call center system according to the present invention.

FIG. 7 is a block diagram showing a sixth embodiment of the present invention. In the system shown in FIG. 7, an IP gateway 11 is connected to the PBX 4. The IP gateway 11 converts a signal from an operator telephone 6a to 6c to an IP signal, and transmits the IP signal to the customer terminal 7. According to the system of FIG. 7, it is possible to make effective use of an existing PBX.

As described in detail above, according to the present invention, it is possible for a customer to select a desired operator that will handle his or her call. For this reason, customer satisfaction is improved, and there is an increase in re-access to the call center.

According to the present invention, it is possible to recognize the status of available operators quickly, so that it is possible eliminate processing delays by accessing a database of historical information.

Further, according to the present invention by statistically managing operator information of selected operators, it is possible to facilitate an evaluation of operator capabilities.

What is claimed is:

1. A call center system in which a customer's computer terminal is connected via the Internet to an operator's computer terminal provided in a call center and a customer's telephone is connected via a public telephone network to an operator's telephone in a call center, wherein said call center system comprising:
   a storage means for storing historical information with regard to handling of a plurality of customers in the past,
   a customer data receiving means for receiving identification data of a customer from said customer's computer terminal,
   an information acquiring means for acquiring historical information of said customer corresponding to said received identification data from said stored historical information,
   a historical information providing means for providing said acquired historical information to said customer's computer terminal,
   a requesting means for requesting said customer's computer terminal to select an operator to be contacted, based on said historical information provided to said customer's computer terminal,
   a selection data receiving means for receiving information of an operator which said customer selected from said historical information,
   a first connection means for connecting a selected operator's computer terminal to said customer's computer terminal, and
   a second connection means for connecting a selected operator's telephone to said customer's telephone.

2. A call center system according to claim 1, wherein said second connection means is a gatekeeper provided in said call center.

3. A call center system according to claim 1, wherein said second connection means is a private branch exchange provided in said call center.

4. A call center system in which a customer's computer terminal is connected via the Internet to an operator's computer terminal provided in a call center, wherein said call center system comprising:
   a storage means for storing historical information with regard to handling of a plurality of customers in the past,
   a customer data receiving means for receiving identification data of a customer from said customer's computer terminal,
   an information acquiring means for acquiring historical information of said customer corresponding to said received identification data from said stored historical information,
   a historical information providing means for providing said acquired historical information to said customer's computer terminal,
   a requesting means for requesting said customer's computer terminal to select an operator to be contacted, based on said historical information provided to said customer's computer terminal,
   a selection data receiving means for receiving information of an operator which said customer selected from said historical information,
   a connection means for connecting a selected operator's computer terminal to said customer's computer terminal, and
   a gateway for transferring a selected operator's voice to said customer's computer terminal.

5. A call center system according to claim 4, wherein said selected operator's voice is input to said gateway via a private branch exchange provided in said call center.

6. A call center system in which a customer's computer terminal is connected via the Internet to an operator's computer terminal provided in a call center, wherein said call center system comprising:
   a storage means for storing historical information with regard to handling of a plurality of customers in the past,
   a customer data receiving means for receiving identification data of a customer from said customer's computer terminal,
   an information acquiring means for acquiring historical information of said customer corresponding to said received identification data from said stored historical information,
   a historical information providing means for providing said acquired historical information to said customer's computer terminal, a requesting means for requesting said customer's computer terminal to select an operator to be contacted, based on said historical information provided to said customer's computer terminal, a selection data receiving means for receiving information of an operator which said customer selected from said historical information, a connection means for connecting a selected operator's computer terminal to said customer's computer terminal, and a gatekeeper for transferring a selected operator's voice to said customer's computer terminal.

7. A call center system according to claim 1, wherein said call center system further comprising;

a verification means for verifying whether or not said selected operator is available, and a notification means for notifying said customer's computer terminal that said selected operator is not available, and requesting said customer's computer terminal to select another operator, in a case in which said selected operator is not available.

8. A call center system according to claim 1, wherein said call center system further comprising;

a verification means for verifying whether or not said selected operator is available, and an alternate connection means for connecting a terminal of another operator to said customer's computer terminal, in a case in which said selected operator is not available.

9. A call center system according to claim 1, wherein said call center system further comprising;

a monitoring means for continuously monitoring whether or not each operator in said call center is available, and a monitoring results providing means for providing results of said monitoring to said customer's computer terminal.

10. A method for receiving a call in a call center system in which a customer's computer terminal is connected via the Internet to an operator's computer terminal provided in a call center and a customer's telephone is connected via a public telephone network to an operator's telephone in a call center, wherein said method comprising the steps of;

storing historical information with regard to handling of a plurality of customers in the past, receiving identification data of a customer from said customer's computer terminal, acquiring historical information of said customer corresponding to said received identification data from said stored historical information, providing said acquired historical information to said customer's computer terminal, requesting said customer's computer terminal to select an operator to be contacted, based on said historical information provided to said customer's computer terminal, receiving information of an operator which said customer selected from said historical information, connecting a selected operator's computer terminal to said customer's computer terminal, and connecting a selected operator's telephone to said customer's telephone.

11. A method for receiving a call in a call center system in which a customer's computer terminal is connected via the Internet to an operator's computer terminal provided in a call center, wherein said method comprising the steps of;

storing historical information with regard to handling of a plurality of customers in the past, receiving identification data of a customer from said customer's computer terminal, acquiring historical information of said customer corresponding to said received identification data from said stored historical information, providing said acquired historical information to said customer's computer terminal, requesting said customer's computer terminal to select an operator to be contacted, based on said historical information provided to said customer's computer terminal, receiving information of an operator which said customer selected from said historical information, connecting a selected operator's computer terminal to said customer's computer terminal, and transferring a selected operator's voice to said customer's computer terminal using a gateway provided in said call center.

12. A method for receiving a call in a call center system according to claim 11, wherein in said transferring step, said selected operator's voice is input to said gateway via a private branch exchange provided in said call center.

13. A method for receiving a call in a call center system according to claim 11, wherein in said transferring step, said selected operator's voice is transferred to said customer's computer terminal via a gatekeeper provided in said call center.

14. A method for receiving a call in a call center system according to claim 10, wherein said method further comprising the steps of;

verifying whether or not said selected operator is available, and notifying said customer's computer terminal that said selected operator is not available, and requesting said customer's computer terminal to select another operator, in a case in which said selected operator is not available.

15. A method for receiving a call in a call center system according to claim 10, wherein said method further comprising the steps of;

verifying whether or not said selected operator is available, and connecting another operator's telephone to said customer's telephone, in a case in which said selected operator is not available.

16. A method for receiving a call in a call center system according to claim 10, wherein said method further comprising the steps of;

monitoring continuously whether or not each operator in said call center is available, and providing results of said monitoring to said customer's computer terminal.

17. A computer program for receiving a call in a call center system in which a customer's computer terminal is connected via the Internet to an operator's computer terminal provided in a call center and a customer's telephone is connected via a public telephone network to an operator's telephone in a call center, wherein said computer program causing a computer to execute sequentially a process comprising the steps of;

storing historical information with regard to handling of a plurality of customers in the past, receiving identification data of a customer from said customer's computer terminal, acquiring historical information of said customer corresponding to said received identification data from said stored historical information, providing said acquired historical information to said customer's computer terminal, requesting said customer's computer terminal to select an operator to be contacted, based on said historical information provided to said customer's computer terminal, receiving information of an operator which said customer selected from said historical information, connecting a selected operator's computer terminal to said customer's computer terminal, and connecting a selected operator's telephone to said customer's telephone.

18. A computer program for receiving a call in a call center system in which a customer's computer terminal is connected via the Internet to an operator's computer terminal provided in a call center, wherein said computer program causing a computer to execute sequentially a process comprising the steps of;

storing historical information with regard to handling of a plurality of customers in the past, receiving identification data of a customer from said customer's computer terminal, acquiring historical information of said customer corresponding to said received identification data from said stored historical information, providing said acquired historical information to said customer's computer terminal, requesting said customer's computer terminal to select an operator to be contacted, based on said historical information provided to said customer's computer terminal, receiving information of an operator which said customer selected from said historical information, connecting a selected operator's computer terminal to said customer's computer terminal, and transferring a selected operator's voice to said customer's computer terminal using a gateway provided in said call center.

19. A computer program for receiving a call in a call center system according to claim 17, wherein said computer program further comprising the steps of;

verifying whether or not said selected operator is available, and notifying said customer's computer terminal that said selected operator is not available, and requesting said customer's computer terminal to select another operator, in a case in which said selected operator is not available.

20. A computer program for receiving a call in a call center system according to claim 17, wherein said computer program further comprising the steps of;

verifying whether or not said selected operator is available, and connecting another operator's telephone to said customer's telephone, in a case in which said selected operator is not available.

21. A computer program for receiving a call in a call center system according to claim 17, wherein said computer program further comprising the steps of;

monitoring continuously whether or not each operator in said call center is available, and providing results of said monitoring to said customer's computer terminal.

* * * * *